United States Patent
Mullen et al.

(10) Patent No.: US 12,503,541 B2
(45) Date of Patent: Dec. 23, 2025

(54) CURABLE (METH)ACRYLATE COMPOSITIONS

(71) Applicant: Henkel AG & Co. KGaA, Duesseldorf (DE)

(72) Inventors: David Mullen, Navan (IE); Lynne Sheerin, Sallins (IE); Mark Loane, Pluckerstown (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 822 days.

(21) Appl. No.: 17/676,039

(22) Filed: Feb. 18, 2022

(65) Prior Publication Data
US 2022/0251278 A1 Aug. 11, 2022

Related U.S. Application Data

(63) Continuation of application No. PCT/EP2018/070793, filed on Jul. 31, 2018.

(30) Foreign Application Priority Data

Aug. 24, 2017 (GB) ...................................... 1713638

(51) Int. Cl.
C08F 290/06 (2006.01)
C08K 13/02 (2006.01)

(52) U.S. Cl.
CPC .......... *C08F 290/062* (2013.01); *C08K 13/02* (2013.01)

(58) Field of Classification Search
None
See application file for complete search history.

(56) References Cited

U.S. PATENT DOCUMENTS

| | | | |
|---|---|---|---|
| 5,605,999 A | 2/1997 | Chu et al. | |
| 5,865,936 A | 2/1999 | Edelman et al. | |
| 2004/0112507 A1 | 6/2004 | Luong et al. | |
| 2006/0089321 A1 | 4/2006 | Walter et al. | |
| 2006/0089430 A1 | 4/2006 | Kawakami et al. | |
| 2006/0089431 A1 | 4/2006 | Kawakami et al. | |
| 2006/0089432 A1 | 4/2006 | Kawakami et al. | |
| 2008/0242764 A1 | 10/2008 | Wallace et al. | |
| 2013/0309040 A1 | 11/2013 | Phillips | |
| 2013/0345383 A1* | 12/2013 | Chen | C08G 63/914 526/309 |
| 2015/0361313 A1* | 12/2015 | Xie | C09J 133/00 525/221 |
| 2016/0053050 A1* | 2/2016 | Tabor | C08G 18/73 525/445 |
| 2016/0319167 A1 | 11/2016 | Kim et al. | |
| 2016/0326344 A1 | 11/2016 | Yano | |
| 2018/0237645 A1 | 8/2018 | Tsutsumi et al. | |
| 2019/0177579 A1* | 6/2019 | Ota | C08F 290/067 |
| 2020/0048394 A1* | 2/2020 | Hoevel | C08F 2/48 |
| 2020/0095418 A1* | 3/2020 | Konarski | C09J 109/02 |

FOREIGN PATENT DOCUMENTS

| | | |
|---|---|---|
| CN | 1198460 | 11/1998 |
| CN | 106029786 | 10/2016 |
| CN | 106752985 | 5/2017 |
| DE | 102013223876 | 5/2015 |
| EP | 0659859 | 6/1995 |
| JP | 2001139810 A | 5/2001 |
| JP | 2001200051 | 7/2001 |
| JP | 2008056879 | 3/2008 |
| TW | 201418432 | 5/2014 |
| WO | 2006016625 A1 | 2/2006 |
| WO | 2006046472 A1 | 5/2006 |
| WO | 2016184598 | 11/2016 |

OTHER PUBLICATIONS

International Search Report issued in connection with International Patent Application No. PCT/EP2018/070793 mailed on Oct. 15, 2018.

* cited by examiner

*Primary Examiner* — Robert T Butcher
(74) *Attorney, Agent, or Firm* — Steven C. Bauman

(57) ABSTRACT

A two-part curable (adhesive) composition comprising a Part A and a Part B:
Part A comprising:
  (i) a curable (meth)acrylate component;
  (ii) a peroxide; and
  (iii) a phenolic lipid; and
Part B comprising:
  (i) a curable (meth)acrylate component; and
  (ii) a transition metal component. These compositions are tack free, demonstrate good cure through volume and desirable bond strengths on both active and passive substrates. The two-part curable (adhesive) composition can cure across relatively large bond gaps and are non-volatile.

54 Claims, 3 Drawing Sheets

CURABLE (METH)ACRYLATE COMPOSITIONS

BACKGROUND

Field

The present invention relates to compositions which cure to provide a tack-free form. Of interest are compositions that can cure across relatively large bond gaps. It is desirable to achieve bonding both on active surfaces and on inactive surfaces.

Description of Related Art

Anaerobically curable compositions are well known in the art. Oxygen (air) has a stabilising effect on anaerobically curable compositions. It inhibits the cure of adhesive that is exposed to air. When air is excluded the composition cures. Such anaerobically curable compositions are well known for a wide range of applications including thread locking, forming bonds between close fitting metal parts such as flanges, etc.

An issue that arises is that, in general, anaerobic compositions are surface activated. This means that the surface must be such so as to activate the composition. Not all surfaces are active in this way and are thus passive. Accordingly such compositions are not useful for bonding passive substrates.

Furthermore due to the requirement for exclusion of air the compositions need to be confined between close fitting surfaces. When larger amounts of composition are present, then it becomes more difficult to exclude air sufficiently to induce cure. Accordingly it is difficult to achieve cure through volume ("CTV").

In such cases even if cure is induced, there can be insufficient cure through the entire volume of the composition, rendering the composition tacky. Partial cure is undesirable.

For these reasons it is desirable to provide a curable (adhesive) composition that addresses a market need for tack free surface, CTV and desirable bond strengths on active and passive substrates. As above, it is desirable to provide a composition that cures to provide a tack-free form. It is desirable to provide a composition that can cure across relatively large bond gaps. It is desirable to achieve bonding both on active surfaces and on inactive surfaces. It is further desirable to achieve good bond strengths. Furthermore it is desirable to provide a composition that is non-volatile. It will be appreciated that any composition that achieves all of, or some sub-combination, of such desirable properties will be useful.

SUMMARY

In one aspect, the present invention provides a two-part curable (adhesive) composition comprising a Part A and a Part B:
Part A comprising:
(i) a curable (meth)acrylate component;
(ii) a peroxide; and
(iii) a phenolic lipid; and
Part B comprising:
(i) a curable (meth)acrylate component; and
(ii) a transition metal component.

Compositions of the invention can cure to provide a tack-free form. Compositions of the invention can cure across relatively large bond gaps. Compositions of the invention can cure to achieve bonding both on active surfaces and on inactive surfaces. Compositions of the invention achieve good bond strengths upon curing. Compositions of the invention are non-volatile.

The composition of the invention has been demonstrated to work on the following substrates mild steel, stainless steel, aluminium, PMMA (polymethylmethacrylate), polycarbonate and PVC (polyvinyl chloride) plastics.

Compositions of the invention have been shown to provide tack free surfaces, cure through volume and desirable bond strengths both on active and on passive substrates such as active and passive metals.

The phenolic lipid may comprise a polyol comprising one or more moieties having the following structure:

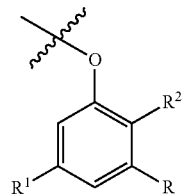

where R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

The phenolic lipid may comprise one or more moieties having the following structure:

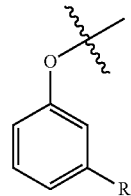

where R is a $C_{10}$-$C_{30}$ aliphatic group, optionally R is a $C_{12}$ to $C_{20}$ aliphatic group, such as a $C_{15}$ aliphatic group.

The polyol may comprise a polyether polyol, a polyester polyol, a Mannich polyol, or combinations thereof. The polyester polyol may comprise a polyester diol.

The polyol may comprise a diol.

The phenolic lipid may comprise a cashew nutshell liquid based polyol. The phenolic lipid may comprise a cashew nutshell liquid based polyol, for example the cashew nutshell liquid based polyol may be a cashew nutshell liquid based polyether polyol, a cashew nutshell liquid based polyester polyol, a cashew nutshell liquid based Mannich polyol, a cashew nutshell liquid based polyester diol or combinations thereof.

The phenolic lipid may comprise a cashew nutshell liquid based polyol comprising one or more moieties having the following structure:

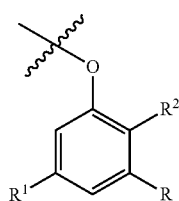

where R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

For example, the phenolic lipid may comprise a cashew nutshell liquid based polyol comprising one or more moieties having the following structure:

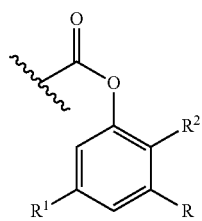

where R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

The phenolic lipid may comprise a cashew nutshell liquid based polyol comprising one or more moieties having the following structure:

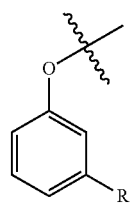

where R is a $C_{10}$-$C_{30}$ aliphatic group, optionally R is a $C_{12}$ to $C_{20}$ aliphatic group, such as a $C_{15}$ aliphatic group.

Optionally, the phenolic lipid may comprise a cashew nutshell liquid based polyol formed by reacting a compound represented by the formula:

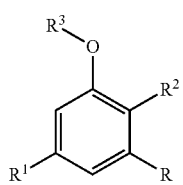

where R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester; and where $R^3$ is hydrogen; with an aromatic or aliphatic carboxylic acid, optionally a polybasic carboxylic acid.

The phenolic lipid may comprise a cashew nutshell liquid based polyol formed by reacting a compound selected from one or more of:

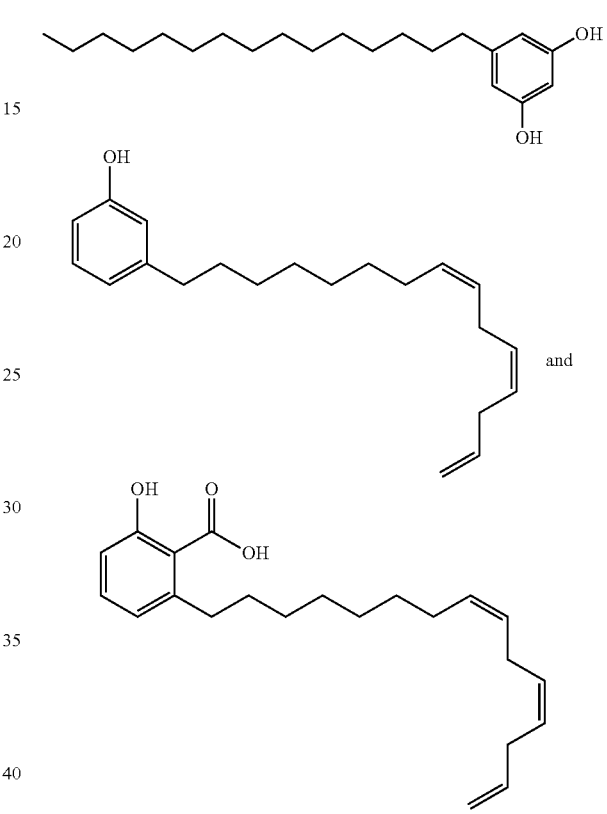

and with an aliphatic or aromatic carboxylic acid, suitably a polybasic carboxylic acid.

Suitably, the phenolic lipid may comprise a cashew nutshell liquid based polyester diol.

The phenolic lipid may comprise a cashew nutshell liquid based polyester diol comprising one or more moieties having the following structure:

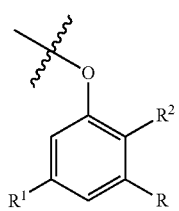

where R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

For example, the phenolic lipid may comprise a cashew nutshell liquid based polyester diol comprising one or more moieties having the following structure:

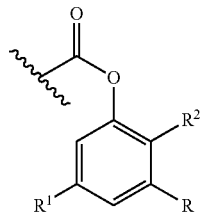

where R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

The phenolic lipid may comprise a cashew nutshell liquid based polyester diol comprising one or more moieties having the following structure:

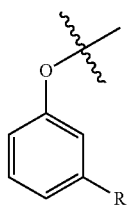

where R is a $C_{10}$-$C_{30}$ aliphatic group, optionally R is a $C_{12}$ to $C_{20}$ aliphatic group, such as a $C_{15}$ aliphatic group.

The phenolic lipid may comprise a resorcinol lipid.

The phenolic lipid may comprise an oligomer having up to 10 repeating phenolic lipid units, for example a phenolic lipid dimer.

The phenolic lipid may comprise a phenolic ring with at least one $C_5$ to a $C_{30}$ side chain attached to the phenolic ring.

Desirably the phenolic lipid component comprises a phenolic ring with at least one $C_{10}$ to a $C_{20}$ side chain attached to the ring.

The phenolic lipid component may comprise a phenolic ring with at least one $C_{15}$ side chain attached to the ring.

Suitably the phenolic lipid component is derived from cashew nutshell oil.

Desirably the side chain terminates in an allyl group.

Optionally the side chain comprises at least two double bonds. The at least two double bonds may be conjugated.

The phenolic lipid component may be represented by the formula:

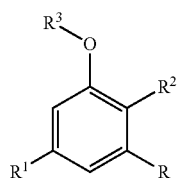

R may be $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester; $R^3$ may be hydrogen, $C_1$-$C_{20}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy. The phenolic lipid may be monomeric of oligomeric.

A curable composition of the invention may have a phenolic lipid component that comprises cardol or an oligomer having up to 10 repeating units of cardol, for example a dimer of cardol:

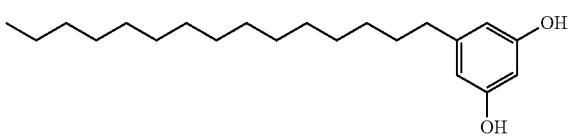

A curable composition of the invention may have a phenolic lipid component that comprises cardanol or an oligomer having up to 10 repeating units of cardanol, for example a dimer of cardanol:

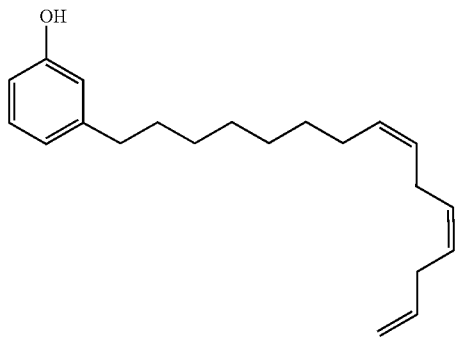

A curable composition of the invention may have a phenolic lipid component that comprises anarcardic acid or an oligomer having up to 10 repeating units of anarcardic acid, for example a dimer of anarcardic acid:

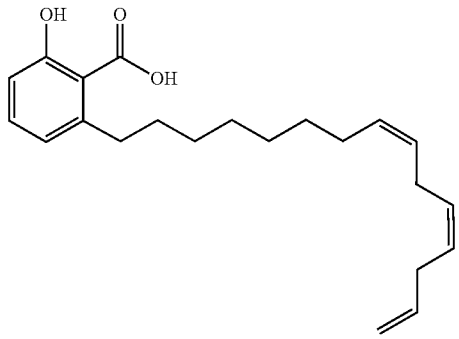

The phenolic lipid may comprise:

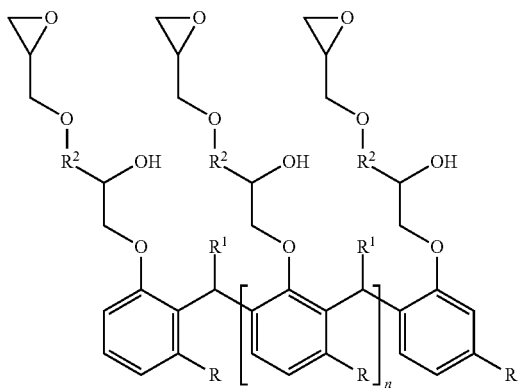

where n is 0 to 10; R may be H, or $C_{10-30}$ aliphatic optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or a glycidoxy group; $R^1$ is H; $R^2$ may be $C_1$-$C_{30}$ aliphatic, $C_6$-$C_{30}$ aromatic, or $C_7$-$C_{30}$ alkaryl, wherein each $R^2$ may be optionally substituted with heteroatoms selected from O, N or S, and wherein each $R^2$ may be optionally substituted with at least one of a hydroxyl, a $C_1$-$C_6$ alkyl, a $C_1$-$C_6$ alkoyl, a $C_1$-$C_6$ ether, oxo, epoxy or a glycidoxy group.

$R^2$ may be $C_1$-$C_{30}$ alkyl, for example $R^2$ may be selected from the group consisting of: —$C_2H_4$—, —$C_5H_{10}$—, —$C_6H_{12}$—, —$C_7H_{14}$—, —$C_8H_{16}$—, —$CH_9H_{18}$—, and —$C_{10}H_{20}$—.

$R^2$ may be $C_6$-$C_{30}$ aryl, for example $R^2$ may be selected from the group consisting of phenyl, phenol, catechol, resorcinol, hydroquinone, pyrogallol, hydroxyhydroquinone, phloroglucitol, naphthyl, and naphthol.

$R^2$ may be $C_7$-$C_{30}$ alkaryl, for example $R^2$ may be a phenyl group substituted with one or more $C_1$-$C_{20}$ aliphatic groups, for example $R^2$ may be selected from the group consisting of:

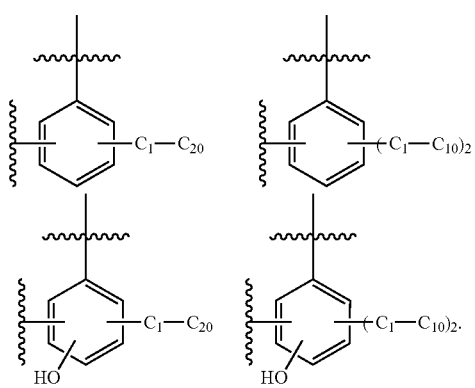

Suitably, $R^2$ may be selected from the group consisting of:

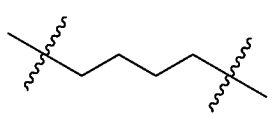

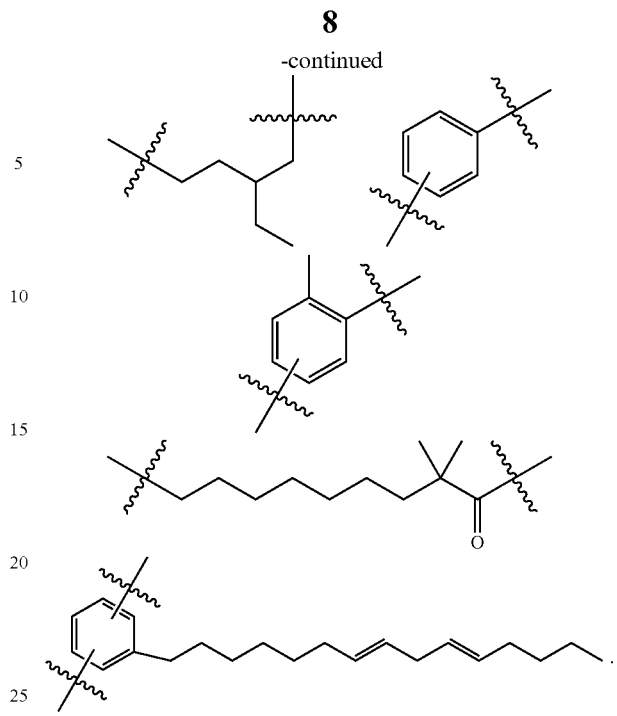

Suitably, n is 0 or 1 or 2 or 3.

In a curable composition of the invention, the phenolic lipid component may comprise a phenolic lipid diol.

In a curable composition of the invention the phenolic lipid component may comprise a cardanol glycidyl ether, for example a cardanol glycidyl ether having the following structure:

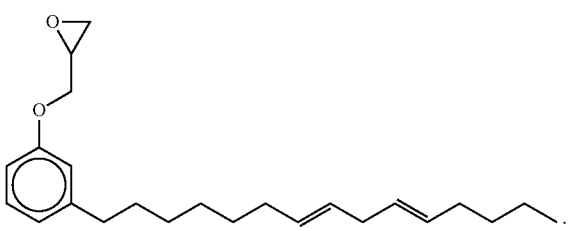

In a curable composition of the invention, the phenolic lipid component may comprise

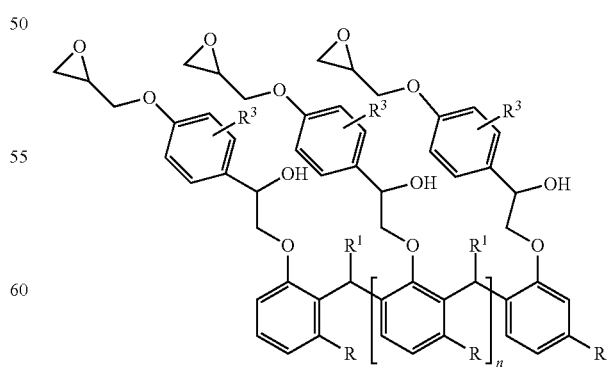

where n is 0 to 10, R may be H, or $C_{10-30}$ aliphatic optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or a glycidoxy group; $R^1$ is H; and $R^3$ is selected from the group consisting of hydrogen, hydroxy, a glycidoxy group, $C_1$-$C_{20}$ aliphatic.

Suitably, n is 0 or 1 or 2 or 3.

In a curable composition of the invention, the phenolic lipid may comprise:

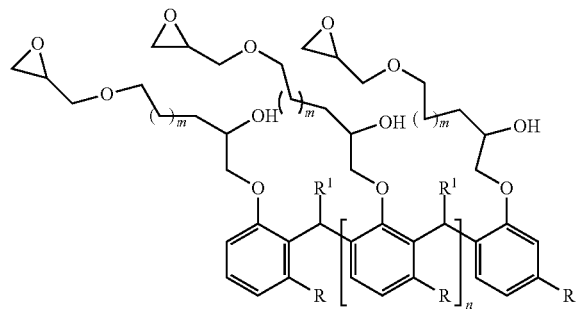

where n is 0 to 10, and m is 0 to 18, for example m may be 1, 2, 3, 4, 5, 6, 8, 10, 12, or 14; R may be H, or $C_{10\text{-}30}$ aliphatic optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or a glycidoxy group; and $R^1$ is H.

Suitably, n is 0 or 1 or 2 or 3.

In a curable composition of the invention, the phenolic lipid may comprise:

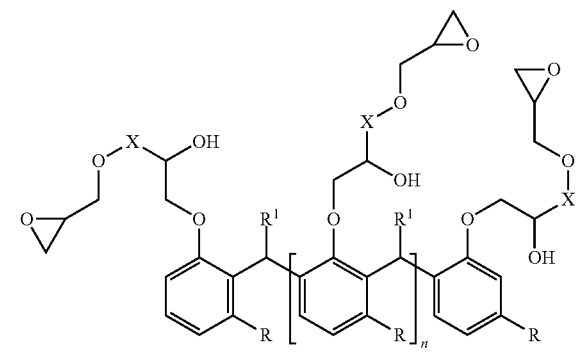

n is 0 to 10, R may be H, or $C_{10\text{-}30}$ aliphatic optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or a glycidoxy group; $R^1$ is H; and X is $C_5$-$C_{20}$ aliphatic, which may optionally be substituted with heteroatoms selected from O, N or S, and wherein X may be optionally substituted with at least one of a hydroxyl, a $C_1$-$C_6$ alkyl, a $C_1$-$C_6$ alkoyl, a $C_1$-$C_6$ ether, oxo, epoxy or a glycidoxy group.

Suitably, n is 0 or 1 or 2 or 3.

The phenolic lipid may be present in an amount of from about 10 to about 30%, such as from about 12 to about 25%, for example from about 15 to about 20% by weight based on the total weight of the composition.

Suitably the transition metal component is a cobalt compound where the transition metal component is cobalt, such as a cobalt (II) form, and optionally the transition metal component includes polymer bound cobalt, cobalt salt such as cobalt neodecanoate, cobalt naphthenate, and any combination thereof.

The transition metal component may be present in an amount from about 0.1 to about 5%, such as from about 0.2 to about 4%, for example from about 0.5 to about 2% by weight based on the total weight of the composition.

Desirably the curable (meth)acrylate component is selected from polyethylene glycol dimethacrylate, hydroxypropyl methacrylate, isopropylidene glycerol methacrylate and combinations thereof.

Suitably the curable (meth)acrylate component is present in an amount of from about 20% to about 80% by weight, for example from about 30 to about 60%, including from about 35% to about 50% based on the total weight of the composition.

A curable composition of the invention may further comprise: a thickener component in an amount from about 20 to about 40% such as from about 24 to about 36%, for example from about 28 to about 32% by weight based on the total weight of the composition. Optionally the thickener component is selected from propoxylated bisphenol A fumarate, fumed silica and combinations thereof.

A curable composition of the invention may further comprise: a chelating agent, such as the tetrasodium salt of ethylenediamine tetraacetic acid ("EDTA"); optionally wherein the chelating agent is present in an amount from about 0.001% to about 4%, for example from about 0.1% to about 3%, such as from about 1% to about 2%, by weight based on the total weight of the composition.

A curable composition of the invention may further comprise: a stabiliser component optionally selected from the group consisting of: butylated hydroxy toluene naphthaquinone and combinations thereof. The stabiliser component may be present in an amount of from about 0.5 to about 5%, such as from about 1 to about 4.5%, for example from about 1 to about 2.5% by weight based on the total weight of the composition.

Suitably, the phenolic liquid comprises a cashew nutshell liquid based polyol, in particular a cashew nutshell liquid based polyester polyol, such as a polyester diol.

The cashew nutshell liquid based polyols can comprise cashew nutshell liquid based polyether polyols, cashew nutshell liquid based polyester polyols, and cashew nutshell liquid based Mannich polyols. Suitable cashew nutshell liquid based polyols include, but are not limited to, Polycard™ polyols available from Chemical Technical Services Inc. of Kettering Ohio (e.g. Polycard™ XFN-50, Polycard™ XFN-53, and Polycard™ 425M), Cardolite Corp. of Monmouth Junction N.J. (e.g., CX-9201, CX 9203, NX-9001, NX-9001LV, NX-9004, NX-5285, GX-9005, GX-9006, GX-9007, GX-9101, GX-9102, GX-9103, GX-9104), and BioBased Technologies of Rogers Ark. (such as Agrol Platinum).

The cashew nutshell liquid based polyester diol may comprise one or moieties having the following structure:

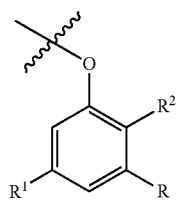

where R is $C_{10}$-$C_{30}$ aliphatic, optionally substituted with heteroatoms selected from O, N or S, and where R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

For example, the cashew nutshell liquid based polyester diol may comprise one or more moieties having the following structures:

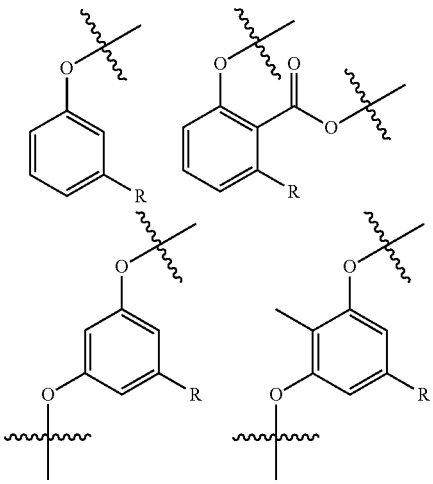

where R is a $C_{10}$-$C_{30}$ aliphatic group, optionally R is a $C_{12}$ to $C_{20}$ aliphatic group, such as a $C_{15}$ aliphatic group.

The cashew nutshell liquid based polyester diol may have a number average molecular weight of from about 1200 to about 2000, such as from about 1500 to about 1800. The cashew nutshell liquid based polyester diol may have a weight average molecular weight of from about 2200 to about 3000, such as from about 2400 to about 2800.

The cashew nutshell liquid based polyester diol may have a viscosity at 25° C. of from about 950 to about 5200 as determined in accordance with ASTM D2196, such as from about 1800 to about 5200, or from about 2200 to about 5200, or from about 1800 to 3500. The cashew nutshell liquid based polyester diol may have a hydroxyl value of from about 65 to about 115 as determined in accordance with ASTM D4274, such as from about 80 to about 115, or about 65 to about 80.

The phenolic lipid may be the commercially available material GX-9203 or NX-9203 which is available from Cardolite.

The present invention provides a phenolic lipid in a two-part (meth)acrylate formulation.

The (meth)acrylate component may be selected from one or more of a wide variety of materials, such as those represented by $H_2C=CGCO_2R^1$ where G may be hydrogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like. Examples include phenoxy ethyl(meth)acrylate, tetrahydrofurfuryl (meth)acrylate, cyclohexyl (meth)acrylate, isobornyl (meth)acrylate, butyl (meth)acrylate, hydroxyethyl (meth)acrylate, and hydroxypropyl (meth)acrylate.

Additional (meth)acrylates suitable for use herein include polyfunctional (meth)acrylates, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylates that may be used herein include silicone (meth)acrylates ("SiMA"), such as those taught by and claimed in U.S. Pat. No. 5,605,999 (Chu), the disclosure of which is hereby expressly incorporated herein by reference.

Of course, combinations of these (meth)acrylates may also be used. Though desirably, the (meth)acrylate component is selected from one or more of N,N-dimethyl acrylamide, phenoxy ethyl(meth)acrylate, tetrahydrofurfuryl (meth)acrylate, cyclohexyl (meth)acrylate, isobornyl (meth) acrylate, butyl (meth)acrylate, hydroxyethyl (meth)acrylate, and hydroxypropyl (meth)acrylate.

The (meth)acrylate component may comprise from about 10% to about 90% by weight, such as from about 20% to about 80% by weight, for example from about 30 to about 60%, including from about 35% to about 50% based on the total weight of the composition.

A number of well-known initiators of free radical polymerization may be incorporated into the curable compositions of the invention including hydroperoxides, such as cumene hydroperoxides ("CHP"), para-menthane hydroperoxide, t-butyl hydroperoxide ("TBH") and t-butyl perbenzoate. Other initiators of free radical polymerization include peroxides, such as benzoyl peroxide, dibenzoyl peroxide, 1,3-bis(t-butylperoxyisopropyl)benzene, 1,1,3,3-tetramethylbutyl hydroperoxide; diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelating agents may ordinarily be present in the compositions in an amount from about 0.001% to about 4%, for example from about 0.1% to about 3%, such as from about 1% to about 2%, by weight based on the total weight of the composition.

Suitable inhibitors include 4-methoxy phenol; hydroquinone; 1,4-naphthoquinone; 2,6-di-tert-butyl-4-methylphenol; and combinations thereof.

A composition of the invention may additionally comprise conventional additives such as thickeners, fillers, pigments, stabilisers, etc., subject to said additives not interfering with effective curing of the adhesive compositions of the invention.

It will be appreciated that compositions of the invention can include non-reactive species including resins. Such components do not participate in an (anaerobic) cure reaction. They are unreactive. Such components may however become part of the cure product having been incorporated therein during the curing of other components. Examples of such non-reactive species include: fumed silica, polyethylene, PTFE, mica, polyamide wax, titanium dioxide, barium sulphate.

BRIEF DESCRIPTION OF THE DRAWINGS

Embodiments of the invention will be described, by way of example only, with reference to the accompanying drawings in which.

DETAILED DESCRIPTION

The current invention addresses a market need for a curable composition that can provide a tack free surface, cure through volume and strengths on active and passive metals. The invention was demonstrated on mild steel, stainless steel, aluminium, PVC, PMMA and polycarbonate plastics.

Definitions

Unless otherwise specified the chemical nomenclature used herein has its usual meaning. As the person skilled in the art is well aware, wavy bonds indicate an attachment point, for example, the compound represented by Rz-X-Ry, where X is:

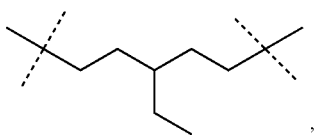

represents the following compound:

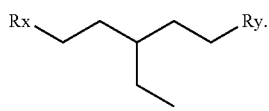

The term "glycidoxy" should be understood as a group having the following formula:

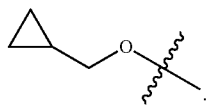

The term "moiety" should be understood as being a sub-unit or substructure within a molecule.

The term Mannich polyol should be understood as a polyol comprising β-amino carbonyl functionality.

The term "liquid" should be understood as meaning a liquid at room temperature.

In the following examples for convenience the percentage by weight (% wt) is not based on the total weight of the composition but instead is expressed based on the weight of the part of the composition in which the component is present. Where reference is made to the percentage by weight based on the total weight of the composition this is based on the overall weight of the combined parts and taking into account a mixing ratio. So the percentage by weight based on the total weight of the composition represents the percentage by weight of each component relative to the combined overall weight of the mixed parts.

The formulation is outlined in Tables 1 and 2

TABLE 1

| Material (Part A) | % wt |
| --- | --- |
| Polyethylene glycol Dimethacrylate | 39.82 |
| Butylated Hydroxytoluene - Stabiliser | 0.1 |
| EDTA Stabiliser | 1.5 |
| Phenolic lipid (GX9203) | 26.64 |
| Propoxylated Bisphenol A Fumarate (Thickener) | 30.44 |
| 1,1,3,3-Tetramethylbutyl Hydroperoxide | 1.50 |

TABLE 2

| Material (Part B) | % wt |
| --- | --- |
| Polyethylene glycol Dimethacrylate | 66.43 |
| Butylated Hydroxytoluene | 0.0122 |
| Propoxylated Bisphenol A Fumarate | 30.64 |
| Cobalt Neodecanoate (10%) | 2.92 |

The composition is prepared by mixing/dissolving the raw materials in Tables 1 and 2 with moderate heating (45° C.) to form the respective parts of the composition. The Part A and Part B compositions are then mixed in a ratio of two parts of Part A with one part of Part B immediately prior to application.

The mixed adhesive is applied to one side of an adherend which is are lap shears (e.g. metal or plastic lapshear) and the assembly is clamped to maintain contact between the adherends. The clamped assembly is allowed to cure for a period of 24 hours, and the tensile strength break force is determined on an Instron machine according to ASTM D1002-05.

Figure 1:
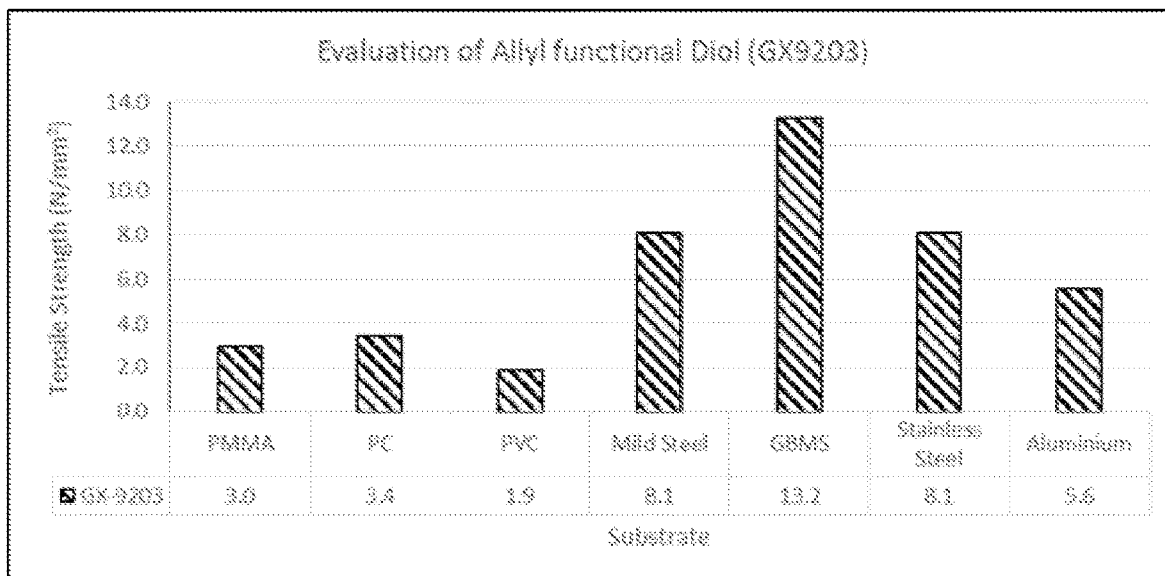
FIG. 1 is a tensile strength evaluation of phenolic lipid (GX9203) in a 2-part acrylate formulation on a variety of substrates.

The results of testing of the composition of Example 1 with various substrates are set out in FIG. 1. The cure strength results on active and inactive metal surfaces show substrate independence, which is further highlighted by the strength results on plastic substrates (PMMA, PC and PVC).

Example 2

Variation in content of Cardolite GX9203 phenolic lipid in two-part acrylate formulation:

| Material (Part A) | % wt | % wt | % wt |
|---|---|---|---|
| Polyethylene glycol Dimethacrylate | 66.46 | 56.46 | 46.46 |
| Butylated Hydroxytoluene | 0.1 | 0.1 | 0.1 |
| EDTA Stabiliser | 1.5 | 1.5 | 1.5 |
| Phenolic lipid (GX9203) | 0 | 10 | 20 |
| Propoxylated Bisphenol A Fumarate | 30.44 | 30.44 | 30.44 |
| 1,1,3,3-Tetramethylbutyl hydroperoxide | 1.50 | 1.50 | 1.50 |

| Material (Part B) | % wt |
|---|---|
| Polyethylene glycol Dimethacrylate | 66.43 |
| Butylated Hydroxytoluene | 0.0122 |
| Propoxylated Bisphenol A Fumarate | 30.64 |
| Cobalt Neodecanoate (10%) | 2.92 |

Tack Free Time

| Phenolic lipid Content (% wt) | Tack Free Time (Hours) |
|---|---|
| 0 | 24+ |
| 10 | 24+ |
| 20 | <24 |

The mixed adhesive is applied to one side of an adherend (metal or plastic lapshear) and the assembly is clamped to maintain contact between the adherends. The clamped assembly is allowed to cure for a period of 24 hours, and the tensile strength break force is determined on an Instron according to ASTM D1002-05.

Figure 2:
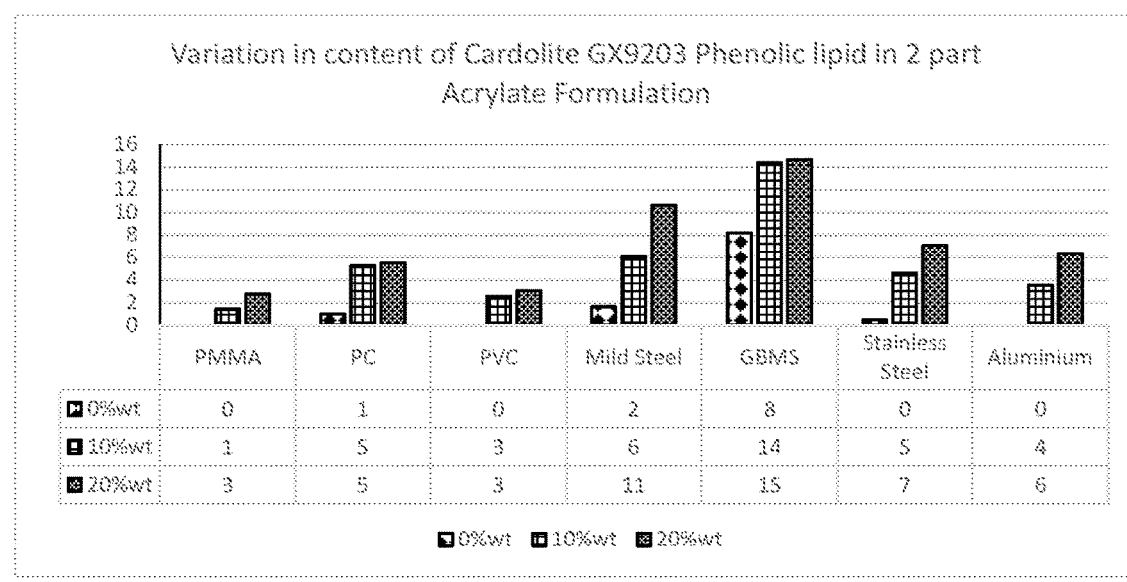
FIG. 2 is an evaluation of the tensile strength of 2-part acrylate formulations where the phenolic lipid content is varied.

FIG. 2 shows that % wt content of the phenolic lipid (GX-9203) in the 2-part acrylate formulation plays a significant role in the tensile strength on both active and inactive substrates.

Example 3

Variation in Monomer Type

Variation in monomer type in two part acrylate formulation with Cardolite GX9203 Phenolic lipid

| Material (A Part) | % wt | % wt |
|---|---|---|
| Hydroxypropyl Methacrylate (HPMA) | 39.82 | 0 |
| Isopropylidene glycerol methacrylate (IPGMA) | 0 | 39.82 |
| Butylated Hydroxytoluene | 0.1 | 0.1 |
| EDTA Stabiliser | 1.5 | 1.5 |
| Phenolic lipid | 26.64 | 26.64 |
| Propoxylated Bisphenol A Fumarate | 30.44 | 30.44 |
| 1,1,3,3-Tetramethylbutyl hydroperoxide | 1.5 | 1.5 |

| Material (B Part) | % wt | % wt |
|---|---|---|
| Hydroxypropyl Methacrylate | 66.43 | 0 |
| Isopropylidene glycerol methacrylate (IPGMA) | 0 | 66.43 |
| Butylated Hydroxytoluene | 0.0122 | 0.0122 |
| Propoxylated Bisphenol A Fumarate | 30.64 | 30.64 |
| Cobalt Neodecanoate (10%) | 2.92 | 2.92 |

Tack Free Time

| Monomer | Tack free Time (Hours) |
|---|---|
| Hydroxypropyl Methacrylate (HPMA) | <24 |
| Isopropylidene glycerol methacrylate (IPGMA) | <24 |

Figure 3:
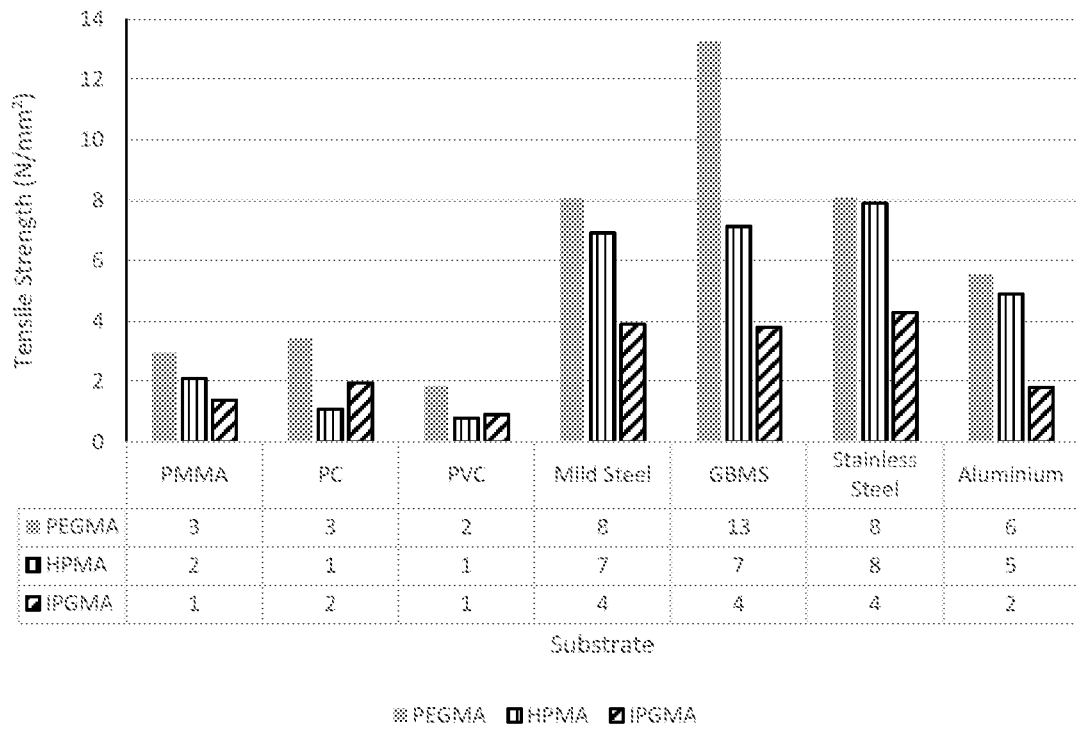
FIG. 3 is an evaluation of the tensile strength of 2-part acrylate formulations using different monomers.

FIG. 3 shows the variation in tensile strength based on monomer source, where the use of dimethacrylate monomer (PEGMA) outperforms mono-methacrylates like HPMA and IPGMA.

Example 4

Replacement of propoxylated Bisphenol A Fumarate with silica in two part acrylate formulations with Cardolite GX9203 Phenolic lipid

| Material (Part A) | % wt | % wt | % wt |
|---|---|---|---|
| Polyethylene glycol Dimethacrylate | 68.26 | 65.26 | 60.26 |
| Butylated Hydroxytoluene | 0.1 | 0.1 | 0.1 |
| (PM17) EDTA Stabiliser | 1.5 | 1.5 | 1.5 |
| Phenolic lipid (GX9203) | 26.64 | 26.64 | 26.64 |
| Silica (Aerosil 200 - Hydrophilic) | 2 | 5 | 10 |
| 1,1,3,3-Tetramethylbutyl hydroperoxide | 1.5 | 1.5 | 1.5 |

| Material (Part B) | % wt | % wt | % wt |
|---|---|---|---|
| Polyethylene glycol Dimethacrylate | 95.07 | 92.07 | 87.07 |
| Butylated Hydroxytoluene | 0.0122 | 0.0122 | 0.0122 |
| Cobalt Neodecanoate (10%) | 2.92 | 2.92 | 2.92 |
| Silica (Aerosil 200 - Hydrophilic) | 2 | 5 | 10 |

Tack Free Time

| Silica Content (% wt) | Tack Free Time (Hours) |
|---|---|
| 2 | 24-48 |
| 5 | <24 |
| 10 | <24 |

Figure 4:
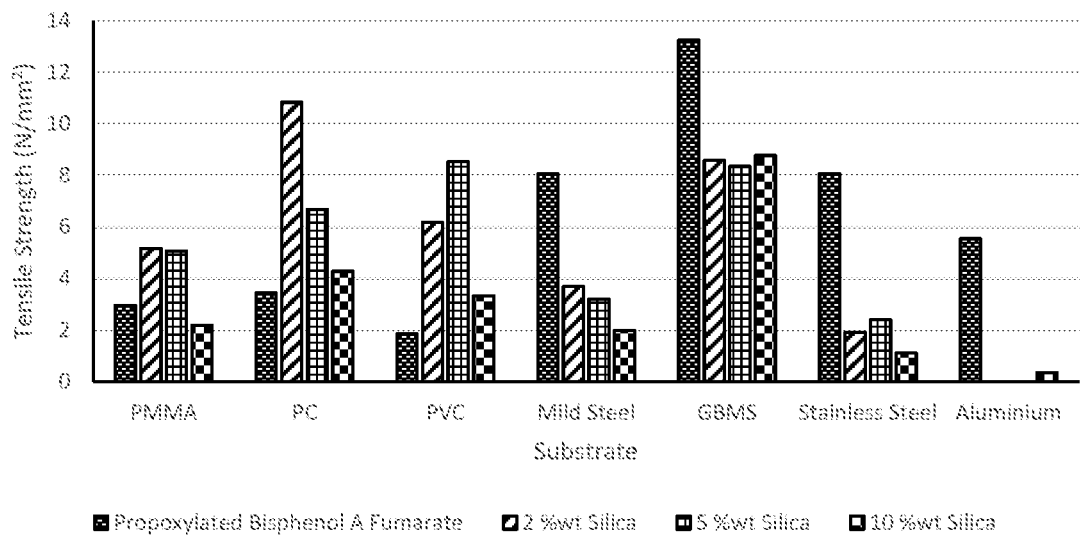
FIG. 4 is an evaluation of the tensile strength of 2-part acrylate formulations with varying filler/thickener content.

FIG. 4 shows the relationship between filler/thickener content and tensile strength, where propoxylated Bisphenol A fumarate can be replaced by hydrophobic silica to improve the "consistency" of the adhesive without impacting tensile strength.

Figure 5:
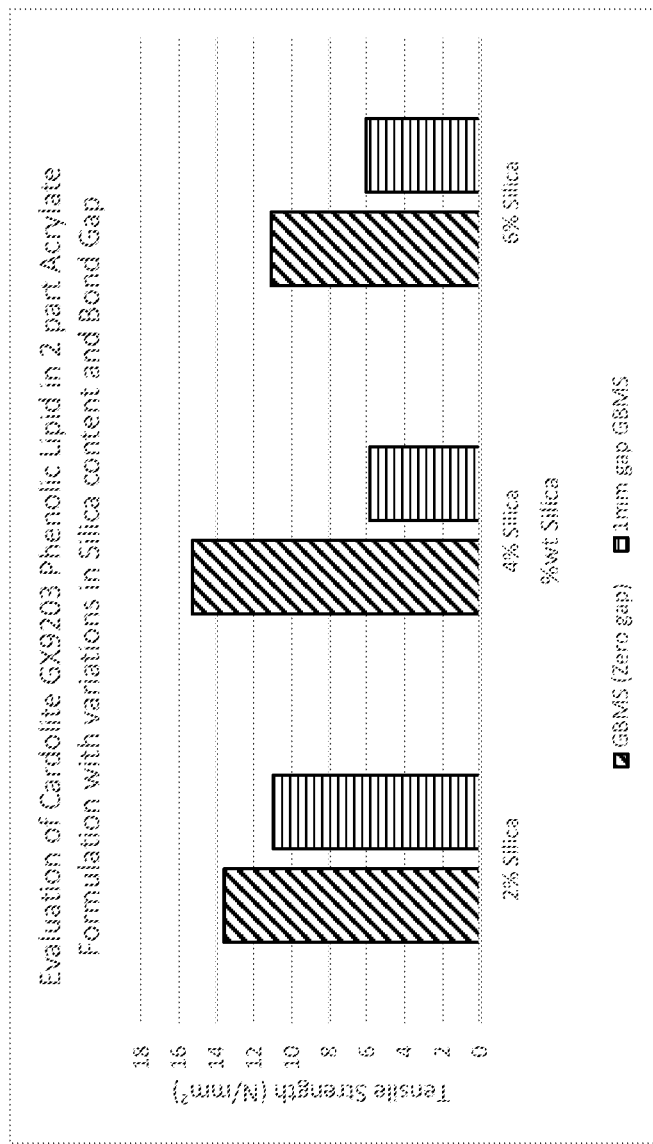
FIG. 5 shows the tensile strength across gap on grit blasted mild steel (GBMS) for varying levels of silica.

FIG. 5 shows the tensile strength across gap on grit blasted mild steel (GBMS) for varying levels of silica.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A two-part curable composition comprising a Part A and a Part B:
   Part A comprising:
   (i) a curable (meth)acrylate component;
   (ii) a peroxide; and
   (iii) a phenolic lipid in an amount of about 10-30 wt % based on the total weight of the composition; and
   Part B comprising:
   (i) a curable (meth)acrylate component; and
   (ii) a transition metal component.

2. The curable composition according to claim 1 wherein the phenolic lipid comprises a polyol comprising one or more moieties having the following structure:

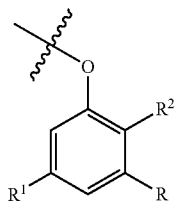

wherein R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

3. The curable composition according to claim 1 wherein the phenolic lipid comprises one or more moieties having the following structure:

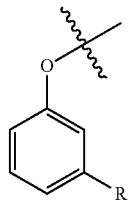

wherein R is a $C_{10}$-$C_{30}$ aliphatic group.

4. The curable composition according to claim 1, wherein the phenolic lipid comprises a cashew nutshell liquid based polyol.

5. The curable composition according to claim 4, wherein the cashew nutshell liquid based polyol is selected from the group consisting of a cashew nutshell liquid based polyether polyol, a cashew nutshell liquid based polyester polyol, a cashew nutshell liquid based Mannich polyol, a cashew nutshell liquid based polyester diol and/or combinations of two or more of these.

6. The curable composition according to claim 1, wherein the phenolic lipid comprises a cashew nutshell liquid based polyester diol comprising one or more moieties having the following structure:

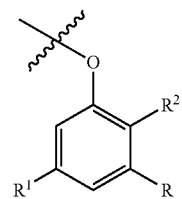

wherein R is $C_{10}$-$C_{30}$ aliphatic, optionally substituted with heteroatoms selected from O, N or S, and wherein R may be optionally substituted with at least one of a hydroxyl, a $C_1$-$C_6$ alkyl, a $C_1$-$C_6$ alkoyl, a $C_1$-$C_6$ ether, oxo, epoxy or glycidoxy; $R^1$ may be hydrogen or hydroxyl; $R^2$ may be hydrogen, a carboxyl group or an ester.

7. The curable composition according to claim 6, wherein the polyester diol comprises one or more moieties having the following structure:

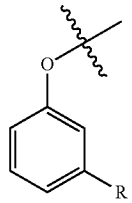

wherein R is a $C_{10}$-$C_{30}$ aliphatic group.

8. The curable composition according to claim 1 wherein the phenolic lipid comprises a resorcinol lipid.

9. The curable composition according to claim 1 wherein the phenolic lipid comprises an oligomer having up to 10 repeating phenolic lipid units.

10. The curable composition according to claim 1 wherein the phenolic lipid comprises a phenolic lipid dimer.

11. The curable composition according to claim 1 wherein the phenolic lipid comprises a phenolic ring with at least one $C_5$ to a $C_{30}$ side chain attached to the ring.

12. The curable composition according to claim 1 wherein the phenolic lipid component comprises a phenolic ring with at least one $C_{10}$ to a $C_{20}$ side chain attached to the ring.

13. The curable composition according to claim 1 wherein the phenolic lipid component comprises a phenolic ring with at least one $C_{15}$ side chain attached to the ring.

14. The curable composition according to claim 1 wherein the phenolic lipid component is derived from cashew nutshell oil.

15. The curable composition according to claim 11 wherein the side chain terminates in an allyl group.

16. The curable composition according to claim 11 wherein the side chain comprises at least two double bonds.

17. The curable composition according to claim 16 wherein at least two double bonds are conjugated.

18. The curable composition according to claim 1 wherein the phenolic lipid component comprises cardol or an oligomer having up to 10 repeating units of cardol:

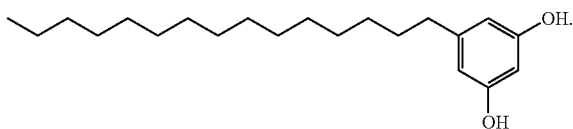

19. The curable composition according to claim 18 wherein the phenolic lipid component comprises a dimer of cardol:

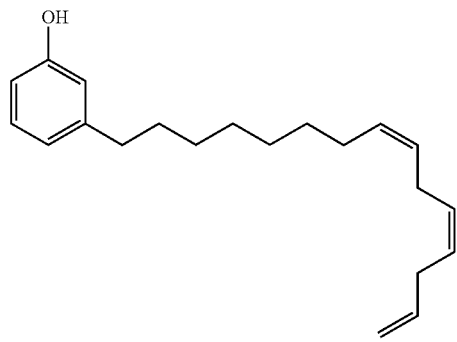

20. The curable composition according to claim 1 wherein the phenolic lipid component comprises cardanol or an oligomer having up to 10 repeating units of cardanol:

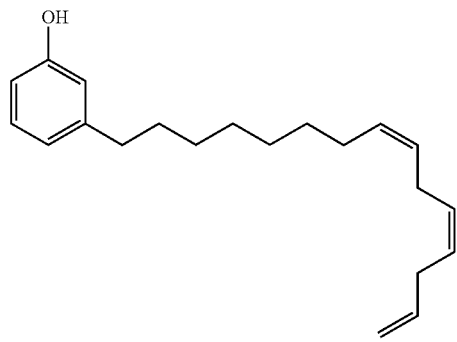

21. The curable composition according to claim 20 wherein the phenolic lipid component comprises a dimer of cardanol:

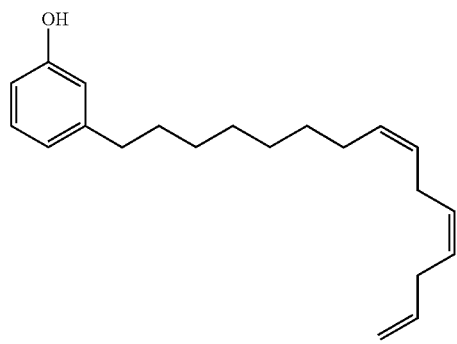

22. The curable composition according to claim 1 wherein the phenolic lipid comprises anarcardic acid or an oligomer having up to 10 repeating units of anarcardic acid:

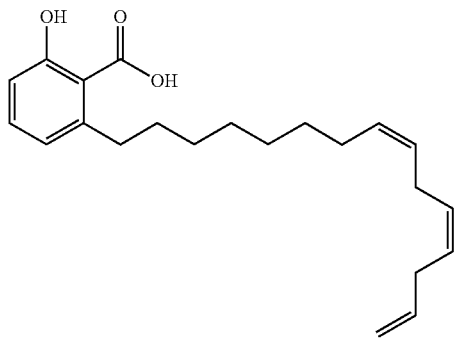

23. The curable composition according to claim 22 wherein the phenolic lipid comprises a dimer of anarcardic acid:

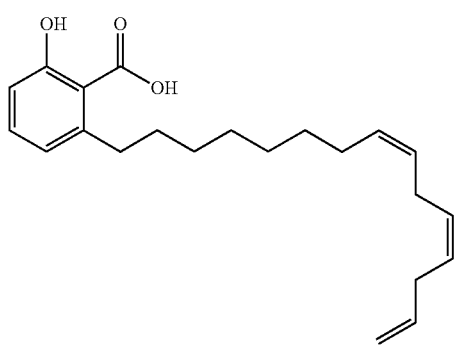

24. The curable composition according to claim 1 wherein phenolic lipid component comprises a phenolic lipid diol.

25. The curable composition according to claim 1 wherein the phenolic lipid component contains a cardanol glycidyl ether.

26. The curable composition according to claim 20, wherein the cardanol glycidyl ether has the following structure:

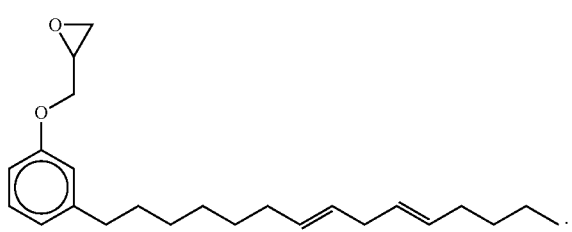

27. The curable composition according to claim 1 wherein the phenolic lipid is present in an amount of from about 12 to about 25% by weight based on the total weight of the composition.

28. The curable composition according to claim 1 wherein the phenolic lipid is present in an amount of from about 15 to about 20% by weight based on the total weight of the composition.

29. The curable composition according to claim 1 wherein the transition metal in the transition metal component is cobalt and the transition metal component is a cobalt compound.

30. The curable composition according to claim 1 wherein the transition metal in the transition metal component is cobalt in a cobalt (II) form.

31. The curable composition according to claim 1 wherein the transition metal component includes polymer bound cobalt, cobalt salt, cobalt naphthenate, and any combination thereof.

32. The curable composition according to claim 1 wherein the transition metal component includes cobalt neodecanoate.

33. The curable composition according to claim 1 wherein the transition metal component is present in an amount from about 0.1 to about 5%.

34. The curable composition according to claim 1 wherein the transition metal component is present in an amount from about 0.2 to about 4% by weight based on the total weight of the composition.

35. The curable composition according to claim 1 wherein the transition metal component is present in an amount from about 0.5 to about 2% by weight based on the total weight of the composition.

36. The curable composition according to claim 1 wherein the curable (meth)acrylate component is selected from polyethylene glycol dimethacrylate, hydroxypropyl methacrylate, isopropylidene glycerol methacrylate and combinations thereof.

37. The curable composition according to claim 1 wherein the curable (meth)acrylate component is present in an amount of from about 20% to about 80% by weight, based on the total weight of the composition.

38. The curable composition according to claim 1 wherein the curable (meth)acrylate component is present in an amount of from about 30 to about 60% based on the total weight of the composition.

39. The curable composition according to claim 1 wherein the curable (meth)acrylate component is present in an amount of from about 35% to about 50% based on the total weight of the composition.

40. The curable composition according to claim 1 further comprising:
a thickener component in an amount from about 20 to about 40% by weight based on the total weight of the composition.

41. The curable composition according to claim 40 wherein the thickener component is present in an amount from about 24 to about 36% by weight based on the total weight of the composition.

42. The curable composition according to claim 40 wherein the thickener component is present in an amount from about 28 to about 32% by weight based on the total weight of the composition.

43. The curable composition according to claim 40 wherein the thickener component is selected from propoxylated bisphenol A fumarate, fumed silica and combinations thereof.

44. The curable composition according to claim 1 further comprising:
a chelating agent.

45. The curable composition according to claim 44 wherein the chelating agent is the tetrasodium salt of ethylenediamine tetraacetic acid ("EDTA").

46. The curable composition according to claim 44 wherein the chelating agent is present in an amount from about 0.001% to about 4% by weight based on the total weight of the composition.

47. The curable composition according to claim 44 wherein the chelating agent is present in an amount from about 0.1% to about 3% by weight based on the total weight of the composition.

48. The curable composition according to claim 44 wherein the chelating agent is present in an amount from about 1% to about 2% by weight based on the total weight of the composition.

49. The curable composition according to claim 1 further comprising: a stabiliser component.

50. The curable composition according to claim 49 wherein the stabiliser component is butylated hydroxy toluene naphthaquinone.

51. The curable composition according to claim 49 wherein the stabiliser component is present in an amount of from about 0.5 to about 5%, by weight based on the total weight of the composition.

52. The curable composition according to claim 49 wherein the stabiliser component is present in an amount of from about 1 to about 4.5% by weight based on the total weight of the composition.

53. The curable composition according to claim 49 wherein the stabiliser component is present in an amount of from about 1 to about 2.5% by weight based on the total weight of the composition.

54. The curable composition according to claim 1, wherein the phenolic lipid is present in an amount of about 10-26.64 wt %, based on the total weight of Part A.

\* \* \* \* \*